United States Patent
Soderstrom et al.

(10) Patent No.: US 7,756,854 B2
(45) Date of Patent: Jul. 13, 2010

(54) MINIMIZATION OF CALCULATION RETRIEVAL IN A MULTIDIMENSIONAL DATABASE

(75) Inventors: Rick Soderstrom, Ottawa (CA); Guillaume Senneville, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/739,722

(22) Filed: Apr. 25, 2007

(65) Prior Publication Data

US 2008/0270479 A1 Oct. 30, 2008

(51) Int. Cl.
*G06F 7/00* (2006.01)
*G06F 17/30* (2006.01)

(52) U.S. Cl. ...................................................... 707/713
(58) Field of Classification Search ...................... None
See application file for complete search history.

(56) References Cited

U.S. PATENT DOCUMENTS 6,574,619 B1 * 6/2003 Reddy et al. ................... 707/2

* cited by examiner

*Primary Examiner*—Neveen Abel Jalil
*Assistant Examiner*—Michael J Hicks
(74) *Attorney, Agent, or Firm*—Francis Lammes; Stephen J. Walder, Jr.; Erin C. Ming (57) ABSTRACT

Updating values in a multidimensional database is provided. Responsive to receiving a value for updating a first cell, a set of first component cells, a set of subsequent component cells, a set of first target cells, a set of subsequent target cells; and a set of unmarked component cells are determined. The first cell, the set of first target cells, and the set of subsequent target cells are marked as changed cells. The set of first component cells and the set of subsequent component cells are marked as allocated cells. The set of unmarked component cells are marked as required cells. Calculations are performed for the first cell, the set of first component cells, the set of subsequent component cells, the first target cells, and the set of subsequent target cells; and only cells marked as changed cells are updated based on the calculations.

16 Claims, 8 Drawing Sheets

MINIMIZATION OF CALCULATION RETRIEVAL IN A MULTIDIMENSIONAL DATABASE

FIELD OF INVENTION

The present invention relates to dimensional data systems. More particularly, the invention relates to a system and method of optimizing calculation and retrieval in a multidimensional database.

BACKGROUND OF THE INVENTION

Business decisions and corporate-client relationships have evolved over the past decades. New tools for processing the wealth of data and information have been deployed to exploit business data. Knowledge-based decision support systems have become highly specialized. In addition to relational databases, business managers and decision makers now look to decision support systems (DSS) and other advanced analytical tools in the hope of obtaining a competitive edge.

In a DSS, the basic capabilities of querying and reporting functions is extended by On-line Analytical Processing (OLAP), allowing a robust multidimensional understanding of the data from a variety of perspectives and hierarchies in a multidimensional database. OLAP operations such as drill-down, roll-up and pivot provide insights into business growth, spending, and sales patterns that would simply not be possible otherwise. Other OLAP functionality includes operations for ranking, moving averages, growth rates, statistical analysis, and "what if" scenarios. This discovery process may be further automated in data mining applications, so that trends and patterns can be retrieved with minimal user input. The patterns, for example, may consist of subtle regularities that cross hierarchical and/or dimension boundaries and, as such, would be less likely to be discovered otherwise.

Multidimensional databases used in DSS typically view data as a multidimensional structure called cube. A multidimensional database comprises a collection of related cubes.

Dimensions, as an essential and distinguishing concept in multidimensional databases, are used for selecting and aggregating data at the desired level of detail.

However, the data to be analyzed often have up to 20 or more dimensions, making computations extremely complex and costly. As the dimensions increase, and the number of members of each dimension increases, the number of cells increases dramatically. The number of cells in many cubes representing a business process in a medium or large company is often too large to provide a fast and efficient calculation.

Many of the cells in a cube can be interconnected by formulas. Cells representing profit, for example, are calculated by the difference between corresponding cells representing revenue and corresponding cells representing expenses. Cells representing a year are computed as the sum of corresponding cells representing months which in turn are computed as the sum of corresponding cells representing days. When a change is made to the value of an existing cell of a cube or a new cell is created, the values of many other dependent cells need to be recalculated. For example, recording the sale of a specific product by a specific seller on a specific day to a specific customer will cause a change in the values of a plurality of dependent cells. It is rarely true that the values of all cells of a cube are needed at any time. Many cells are simple empty. For example, no sale was made on a given day of a given product by a given salesperson to a given customer by a given sales channel. Additionally, any specific change, while affecting some number of other cells will not affect all of the cells.

Hence, there are two challenges with multidimensional databases. One is the size of the storage space that needs to be allocated. If the number of existing input and computed values is large, it is not desirable to load all existing values into the computer main memory to compute the new state of the system caused by a small number of additions or changes to cells. The second problem is the speed of read and write access. In addition to performing the required calculations, accessing the desired cells in the vast array of data in a database can add significantly to the time taken to process a query. The number of cells is often larger than that can be accommodated by the main memory. Only a subset of these cells are required for any query or update action. It is expensive to read cell values into main memory. It is desirable to be able to quickly determine that minimum subset of cells required to answer a query or update the database.

Therefore, there is an unmet need to provide systems and methods which determine the minimum number of existing cell values which must be retrieved or changed to recompute the new state of the multidimensional database.

SUMMARY OF THE INVENTION

In one illustrative embodiment, a mechanism is provided for updating values in a multidimensional database. The illustrative embodiment receives a value for updating a first cell in the multidimensional database. The illustrative embodiment marks the first cell as a changed cell. The illustrative embodiment determines a set of first component cells of the first cell, the set of first component cells affecting the first cell through a first set of formulas. The illustrative embodiment determines a set of subsequent component cells affecting the set of first component cells through a first set of subsequent formulas. The illustrative embodiment marks the set of first component cells and the set of subsequent component cells as allocated cells. The illustrative embodiment determines a set of first target cells, the set of first target cells being affected by the first cell, the set of first component cells, or the set of subsequent component cells through a second set of formulas. The illustrative embodiment determines a set of subsequent target cells affected by the set of first target cells through a second set of subsequent formulas. The illustrative embodiment marks the set of first target cells and the set of subsequent target cells as changed cells. The illustrative embodiment identifies a third set of formulas for the set of first component cells, the set of subsequent component cells, the set of first target cells, or the set of subsequent target cells. The illustrative embodiment determines a set of unmarked component cells through the third set of formulas. The illustrative embodiment marks the set of unmarked component cells as a required cells. The illustrative embodiment performs calculations for the first cell, the set of first component cells, the set of subsequent component cells, the first target cells, and the set of subsequent target cells. The illustrative embodiment updates only cells marked as changed cells based on the calculations.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

These and other features of the invention will become more apparent from the following description in which reference is made to the appended drawings wherein.

DETAILED DESCRIPTION

Figure 1:
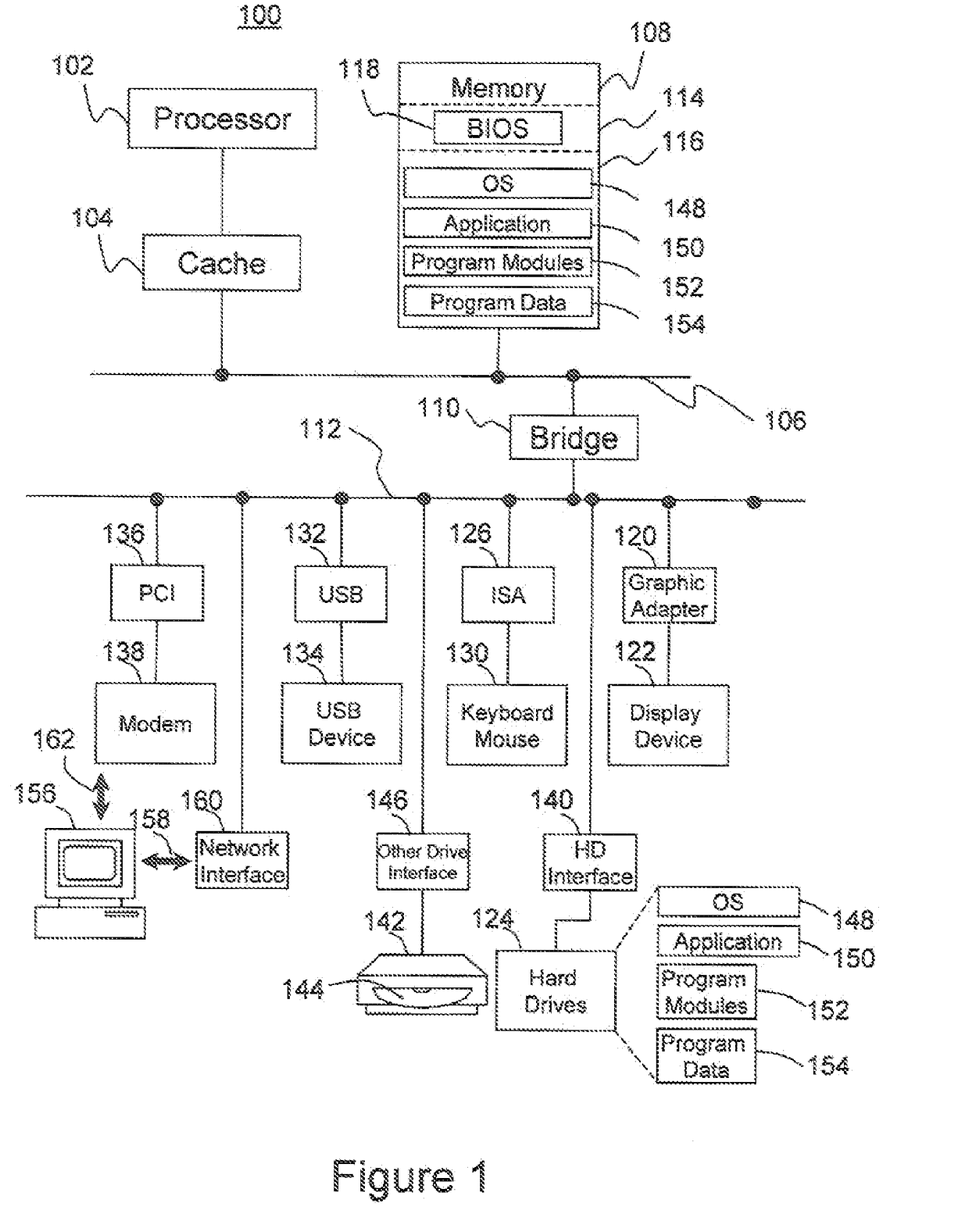
FIG. 1 is a block diagram showing a computer system that uses a method for naming time period in accordance with an embodiment of the present invention.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphic adapter 120 connected to I/O bus 112, receiving user interface information for display device 122. A user may enter commands and information into the system 100 through input devices 130 such as a conventional mouse, a key board, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. A PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 114 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
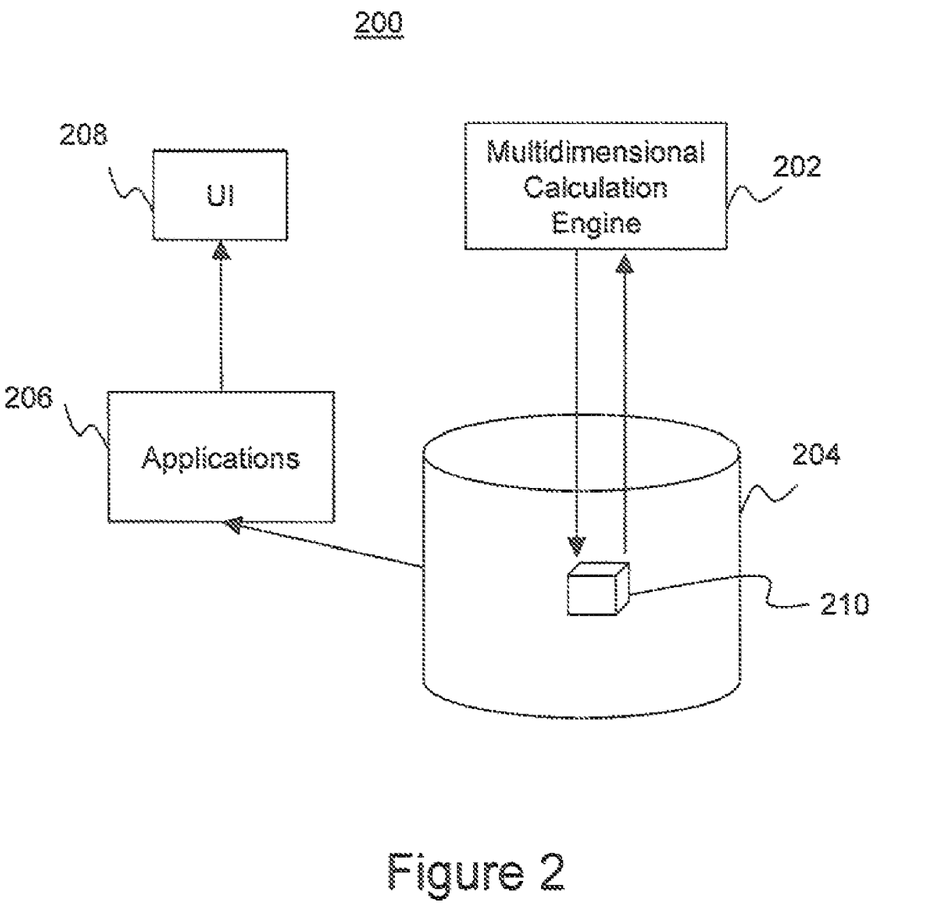
FIG. 2 illustrates a block diagram of an exemplary implementation of the present invention in a computer system.

Also referring to FIG. 1, FIG. 2 illustrates the present invention in an exemplary implementation using one or more computer programs, each of which executes under the control of an operating system, and causes the exemplary system 100 to perform the desired functions as described herein. Thus, using the present specification, the invention may be implemented as a machine, process by using standard programming and/or engineering techniques to produce software, firmware, hardware or any combination thereof.

In the example illustrated in FIG. 2, the present invention includes a multidimensional calculation engine 202, a multidimensional database 204, other applications 206 and user interface 208. The multidimensional calculation engine 202 performs various database operations, including search and retrieval operations, termed queries, insert operations, update operations, and delete operations, against one or more multidimensional databases 204. As will be described later, the relevant data being queried is usually in the form termed cube 210. It should be apparent to a person skilled in the art that the multidimensional database may be stored on a remote or local data storage device.

Figure 3A:
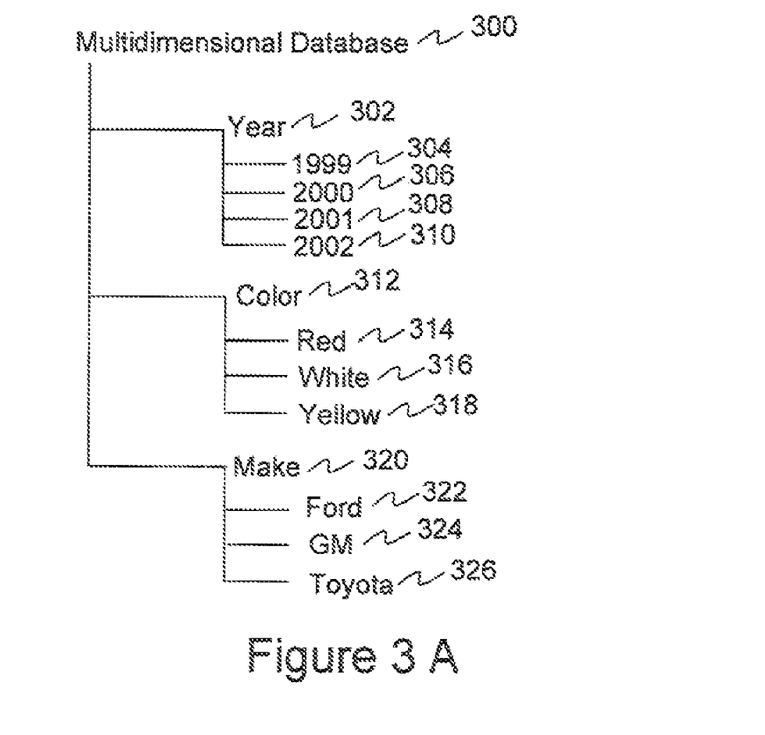
FIG. 3A depicts a diagram of the conceptual structure of a multidimensional database.

FIG. 3A is a diagram that illustrates the conceptual structure of a multidimensional database 300 used in the present invention. By means of example the multidimensional database 300 for automotive industry includes information about the Year in dimension 302, about the Color in dimension 312 and about the Make in dimension 320. A dimension is a set or collection of related members, as defined by an analytic model, and of a similar type in the user's perception of the data. Therefore the time dimension includes members in the levels Years 302 and quarters. The automobile type dimension includes members in the levels Make 320 and models.

Figure 3B:
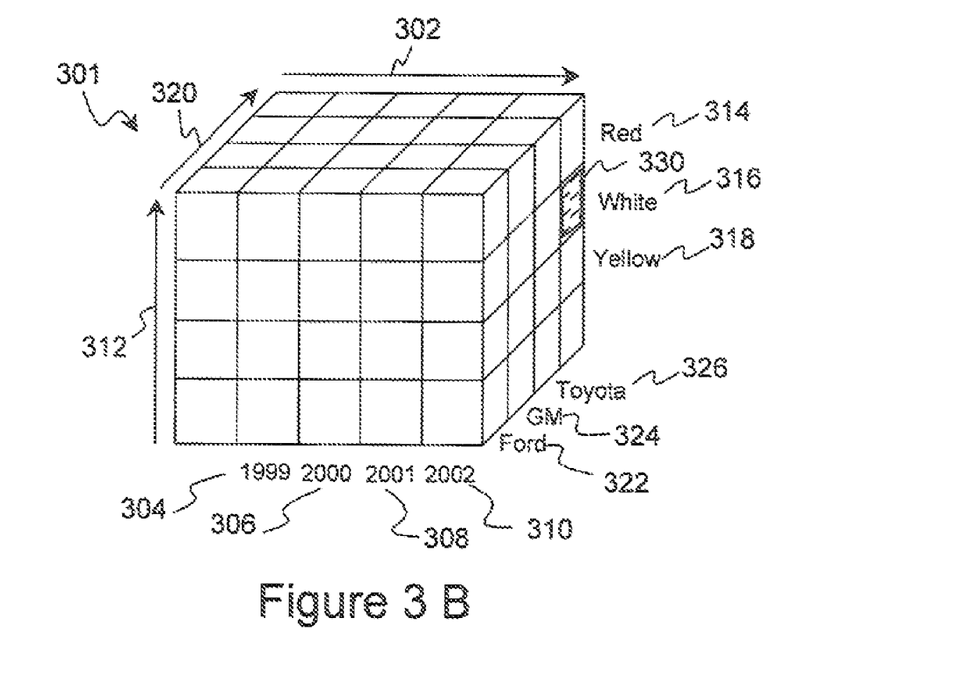
FIG. 3B depicts a diagram for the logical structure of a multidimensional database.

FIG. 3B is a diagram that illustrates the logical structure of a multidimensional database 300 as shown in FIG. 3A. Generally, the multidimensional database 300 is thought to be arranged as a multidimensional cube, so that every cell is located and accessed based on the intersection of the members which define that cell. A three-dimensional cube 301 can be visualized with each dimension forming an edge.

Dimensions offer a very concise, intuitive way of organizing and selecting data for retrieval, exploration and analysis. A dimension serves as an index for identifying values within the cube. If all dimensions have a single member selected, then a single cell is defined. A single data point or cell occurs at the intersection defined by selecting one member from each dimension in a cube. In the exemplary cube shown in FIG. 3B, the dimensions are Year 302, Color 312, and Make 320, each represented by an axis of the cube. The intersection of the dimension members are represented by cells in the multidimensional database that specify a precise intersection along all dimensions that uniquely identifies a single data point. For example, the intersection of White 318, Year 2002 310 and Toyota 326 contains the value, 330, representing a 2002 white Toyota.

It is apparent that the number of cells required to represent all possible relationships between dimensions in a multidimensional database increases dramatically as the number of dimensions is increased.

For example, a simple sales analysis system might be represented by the following dimensions:

Time: a hierarchy of time periods. Example members: Monday Mar. 3, 2005 and Q1 2005;

Organization Structure: a hierarchy of the employees of the organization by function. Examples members: Salesman for 3rd District in Pennsylvania, and Vice President of Sales;

Product: the products the organization produces. For example, a hierarchy of item code Product and Product Line;

Geography: the hierarchy of locations in which the organization operates. Example members: Chicago, USA;

Sales Channel: the enumeration of the methods by which products are sold. Example members: Direct, Partner, Promotion;

Metrics: the measures of the performance of the organization. Example members: Sales, Unit sales, Gross Margin; and Assessment: set of values, scenarios and a set of calculations which allow comparison of unlike metrics. Example members: Actual, Target, industry Benchmarks, Normalized Score.

Exemplary cells in a multidimensional space have a tuple of addresses for the members of each dimension:

$5000 from the actual sale of item code 72080 on Jul. 2, 2004 by salesman #3415 by the direct sales channel in Montreal, QC.

$5,550,000 as the Target for Direct Sales of the Medical products product line in the Eastern Region of the United States under the direction of the Eastern region Sales manager.

In a multidimensional database, formulas relate to members of a dimension. In a time dimension, the formula for 2005 is the sum of the values of quarters 1, 2, 3 and 4 of 2005. Similar summary formulas exist in other dimensions with simple hierarchies of dimension members. Other calculations may not be simple summaries. The gross margin value is a specific formula based on the value of several other metrics. In some cases, formulas involve multiple dimensions.

It is thus obvious that the number of possible data cells rapidly becomes enormous if all combinations of data are to be pre-calculated and ready for reporting. For example, for an application with 5 dimensions with 100 members in each dimension, each cell will have 5 attributes, each attribute being one of the 100 members of each dimension, and the total number of potential data cells is $100^5$ or $10^{10}$. For a cell containing a double precision floating point number requiring 8 bytes, 80 gigabyte are required to reserve a place for all of the potential cells. 80 gigabytes of data would have to be kept on disk instead of in memory, thus slowing the speed of access and calculation drastically.

Figure 4:
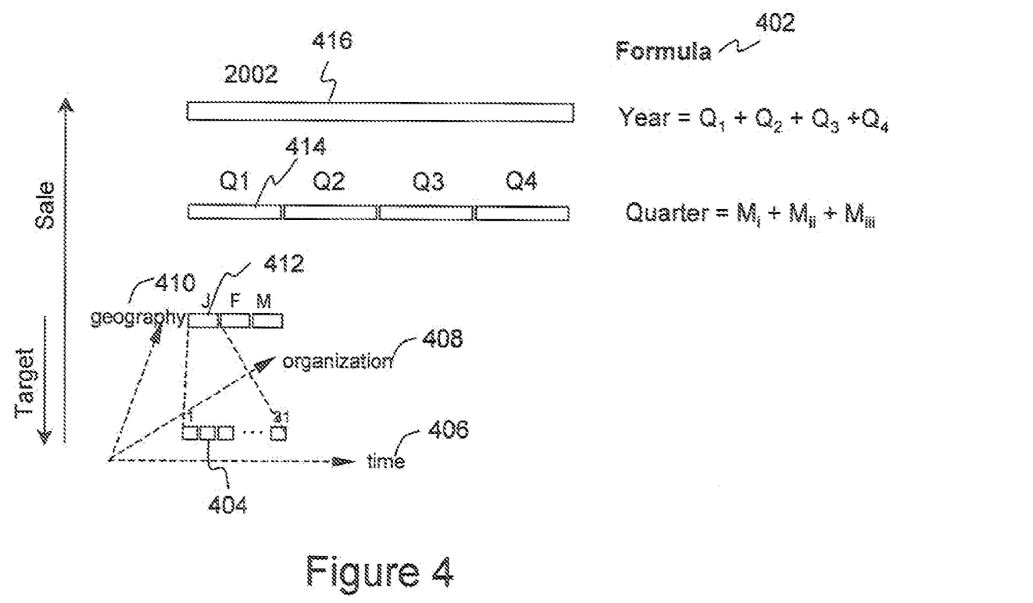
FIG. 4 shows the relationship of the members of a dimension through the formulas.

Referring to FIG. 4, formula 402 for the cells of the multidimensional cubes expressed in terms of other cells are derived from the formulas expressed for one or more dimensions. Multidimensional databases can be thought of as a set of cells of values, connected by a set of cell based formulas. The entry of an input values to a cell, for example, the result of a single sale 404 triggers setting and calculation of one or more dependent cells. In FIG. 4, the hierarchy of time dimension has different levels, starting from lower day level 404, to higher levels 410, 414 and 416 for month, quarter and year, respectively.

Inputs are most often entered at the lowest level of the system. For example, a sale 404 is made on a day (time dimension 406) and by a salesman (organization dimension 408) in a local office (geography dimension 410) and its effect therefore ripples up the time, organization and geography hierarchy so that many corresponding cells are changed. In FIG. 4 all cells relating to, month January 412, Quarter 1 414 and Year 2002 416, and to the salesman and the local office, and will all have to be changed according to the formula 402, which in this example is an additive relation. The term "changed" is intended to describe the state of a cell in a higher level when a value in a cell in a lower level is modified, and this modification affect the cell in the higher level through a formula; the term "changed" can also describe a state of formulas applied to different members at the same higher level. It is also possible that the members of a lower level be propagated, or allocated, by a higher level. The term "allocated" is intended to describe the state of a cell in a lower level when a value in a cell in a higher level is modified, and the cell in the lower level may contribute to this modification through a formula; the term "allocated" can also describe a state of formulas applied to different members at the same lower level. For example, targets may be entered at the monthly level for a product line and be allocated by a set of rules to the day and product items. Such allocations generally trace the formulas in the opposite direction then the normal direction of calculation.

Figure 5:
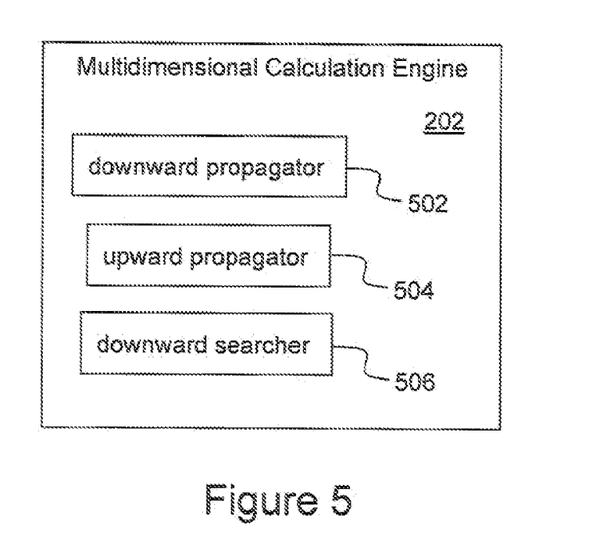
FIG. 5 shows a multidimensional calculation engine with its components.

Referring to FIG. 2 and FIG. 5, in accordance with one embodiment of the present invention, the Multidimensional Calculation Engine 202 may comprise a downward propagator 502 for allocations; an upward propagator 504 for changes and a downward searcher 506.

Figure 6:
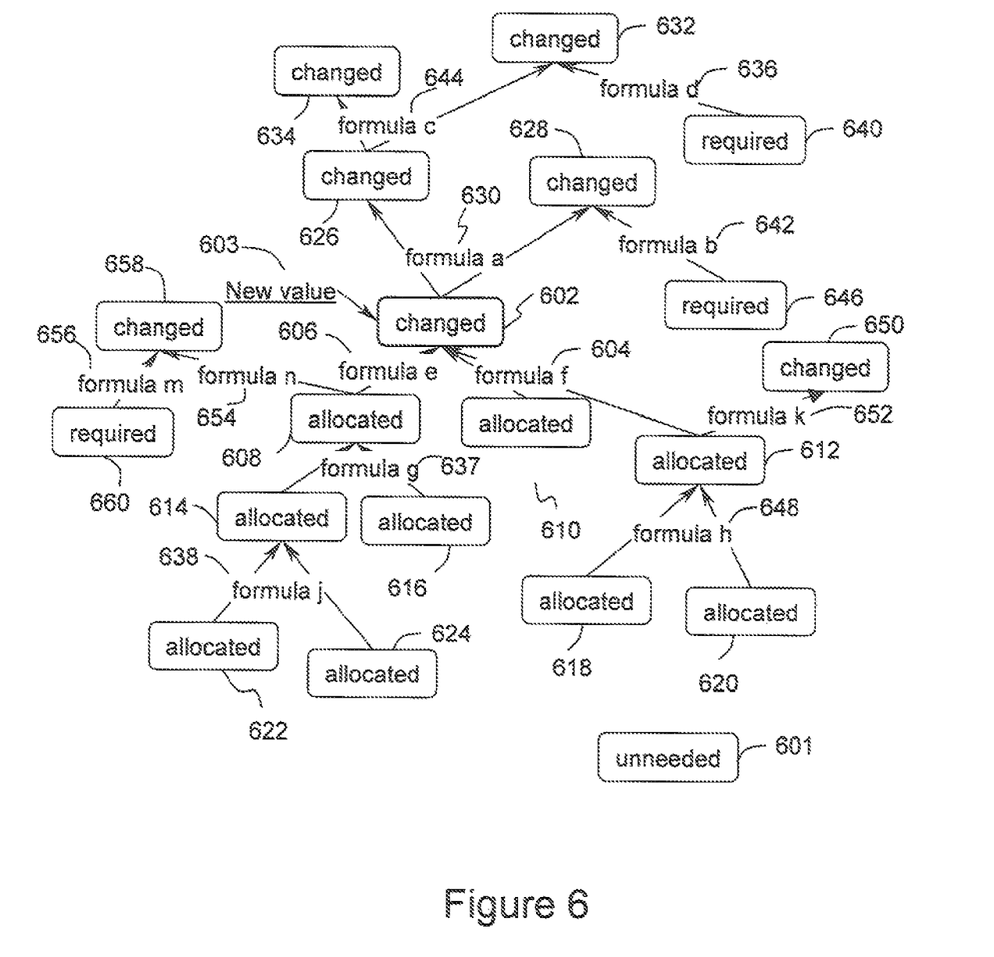
FIG. 6 shows the relationships between "changed", "allocated", "required" cells through formulas.

Referring to FIG. 6, when a new value 603 for a cell 802 is set in a multidimensional data system, the ripple effects between the cells 608, 610, 612, 614, 616, 618, 620, 622, 624, 626, 628, 632, 634, 640, 658 and 660 are traced using paths established by the "formula a" 630, "formula b" 642, "formula c" 644, "formula d" 636, "formula e" 606, "formula f" 604, "formula g" 637, "formula h" 648, "formula j" 638, "formula k" 652, "formula m" 656, and "formula n" 654 which interconnect the cells. This tracing process does not attempt to produce a value but only predicts a minimum set of cell values which will be required to re-compute the effects of the change.

The entire population of cells may thus be divided into three classes: cells which are to be recomputed ("changed" or "allocated", 602, 608, 610, 612, 614, 616, 618, 620, 622, 624, 626, 628, 632, 634, 658, 660); cells for which existing values are required to recomputed these cells ("required", 640, 646, 660) and cells for which existing values are not changed and are not required for computation ("unneeded" 601). The term "required" is intended to describe the state of a cell in a lower level when a value in a cell in a higher level is modified, and the value of the cell in the lower level may be needed to recalculate the value of the cell in the higher level; the term "required" can also describe a state of formulas applied to different members at the same lower level.

As shown in FIG. 6, a cell 602 is a target of the formulas 604, 606. Cells 608, 610, 612 are the component cells of cell 602 using formulas 604, 606; and cell 602 is the target cell of cells 608, 610, and 612 using formulas 604, 606.

Figure 7:
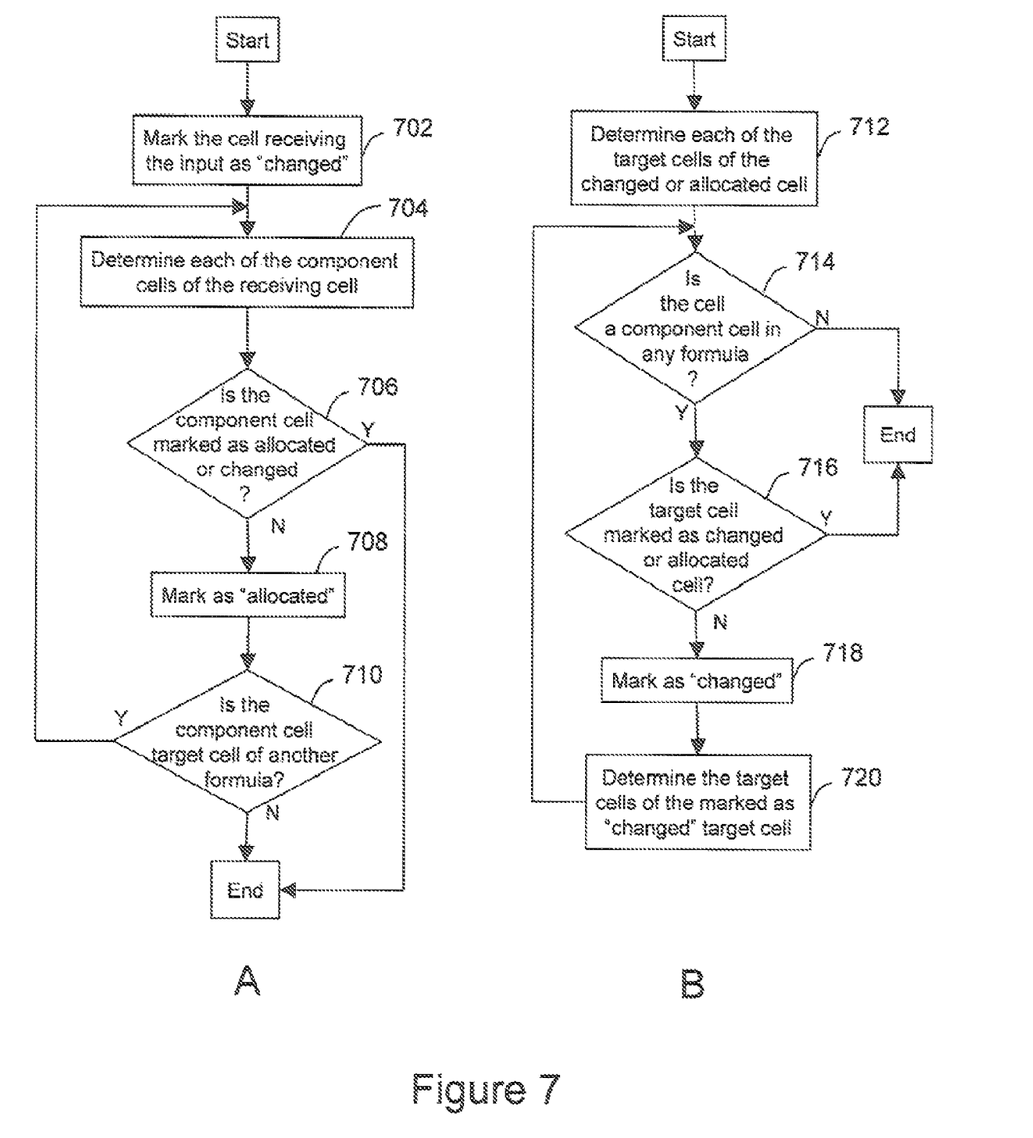
FIG. 7A depicts the steps of downward allocation.
FIG. 7B depicts the steps of upward marking of "changed" cells.
Figure 8:
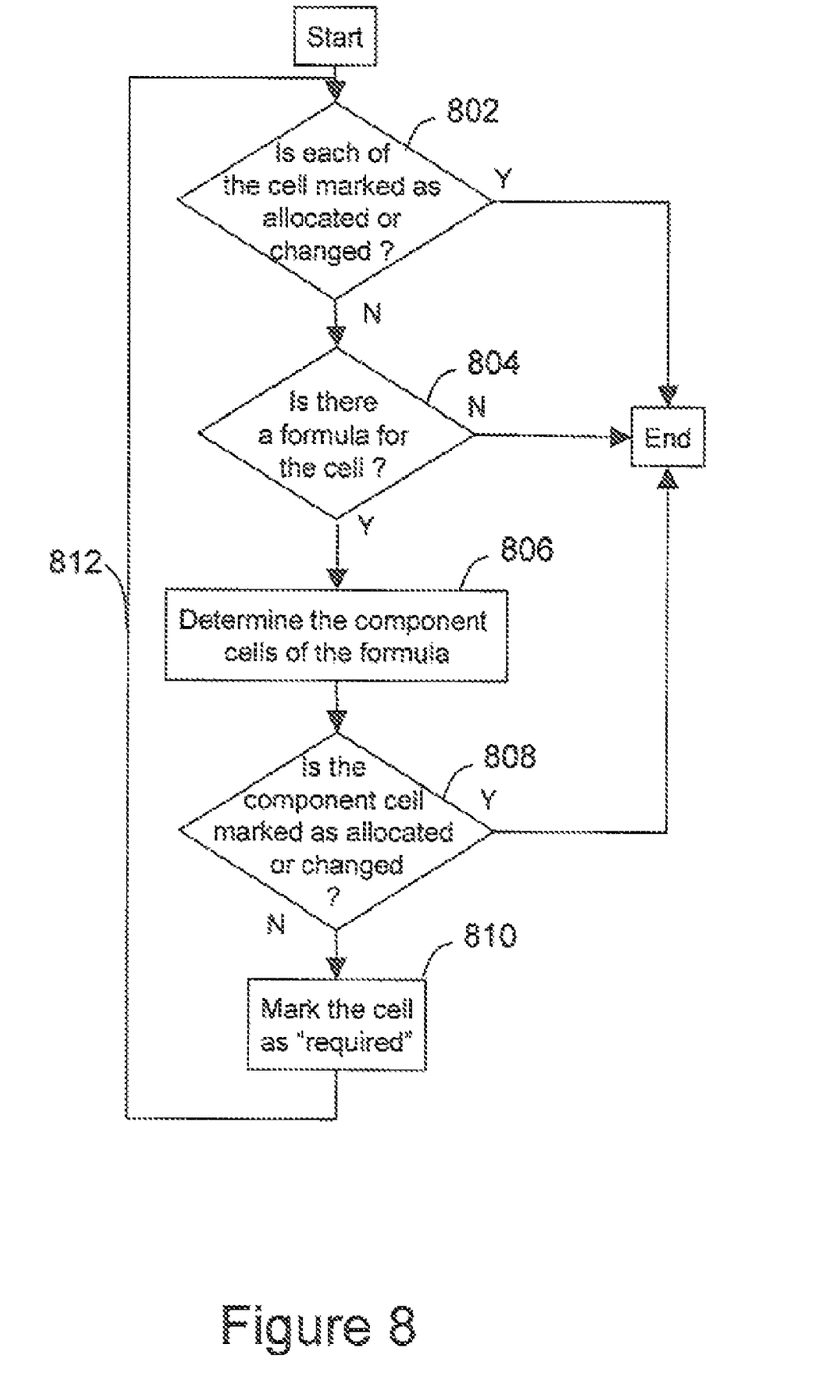
FIG. 8 depicts the steps of downward marking of "required" cells.

Referring to FIGS. 6, 7 and 8, at the beginning of the process, all cells are marked "unneeded". When a new value 603 is received by a cell 602, the multidimensional calculation engine may perform tracing in three possible directions.

The downward propagator 502 determines the allocations. Referring to FIGS. 6 and 7A, the cell 602 which is given a new value 603 is marked "changed" 702. The "changed" cell 602 is determined 704 to be the target cell for formula e 606 and formula f 604, each of the component cells 608, 610, 612 is marked as "allocated" 708 since the original cell value will change the values of the component cells throughout the allocation process. Downward propagation is repeated for all other cells 614, 616, 618 and 620 recursively 710 until a cell 622 or 624 is encountered which is not itself the target cell for a formula. During this process, if any "changed" or "allocated" cell is encountered 706, further downward propagation for allocations is stopped since this path has already been traced.

The upward propagator 504 determines the changes. Referring to FIGS. 6 and 7B, for each "changed" cell resulting from either a direct change 602 or indirectly through allocations 612 via formula k 652, any dependent target cells 626, 628, 650, i.e. cells to which the "changed" cell 602 or "allocated" cell 612 is a component in a calculation through "formula a" 630 or "formula k" 652, are marked as "changed" 718. If during this process a "changed" or "allocated" is encountered 716, further upward tracing for "changed" cells is stopped since this path has been traced. This process is repeated recursively 720 until a cell 632 or 634 is encountered which is not a component cell in any formula 714.

The downward searcher 506 determines the required cells. Referring to FIGS. 6 and 8, for any "changed" cell 832 or "allocated" cell 614 802, if it is a target cell, i.e. if there is a "formula g" 837 or "formula d" 636 which computes the corresponding target cell's value 804, all component cells 622, 624, 626, 640 of that formula 636 638 are required for the new value of the cell to be computed 806. Component cells 622 624 640 which are not already marked "changed" or "allocated" or "required" 806 808 are marked "required" 810. This process is repeated recursively 812 until no formula is found for a cell. If a cell is encountered that has previously been marked "required", "allocated", or "changed" 808 the process is stopped since the effects have already been traced.

It is also possible that a cell 658 is marked as "changed" from an "allocated" cell 608 through "formula n" 654. A cell 660 in turn may be marked as "required" from the "changed" cell 658 through "formula m" 656.

Not all component cells for all formulas are required. Formulas which are commutative can be computed on a relative basis. For example, a formula which computes a monthly total from the day values need not have all of the day values to recompute the monthly total resulting from a change to one day. Only the original monthly total and the changed components are required. For this purpose, every formula is analyzed to determine how many of the components are required to perform a recomputation when one of the components is changed. This list of required components may vary based on which component has changed. Formulas are normally defined based on members and are applied to cells. Therefore the analysis of formulas and the information about modified formulas is associated with members not cells and the number of modified formulas required does not become excessively large.

In other embodiments of the present invention, some cells will be marked as required which will not be needed for the actual calculation. If an expression has a conditional component, all possible branches of the conditional component are considered as being required because it is not known, during the marking process, which of the possible paths of the condition will be traced during the subsequent calculation.

Figure 9:
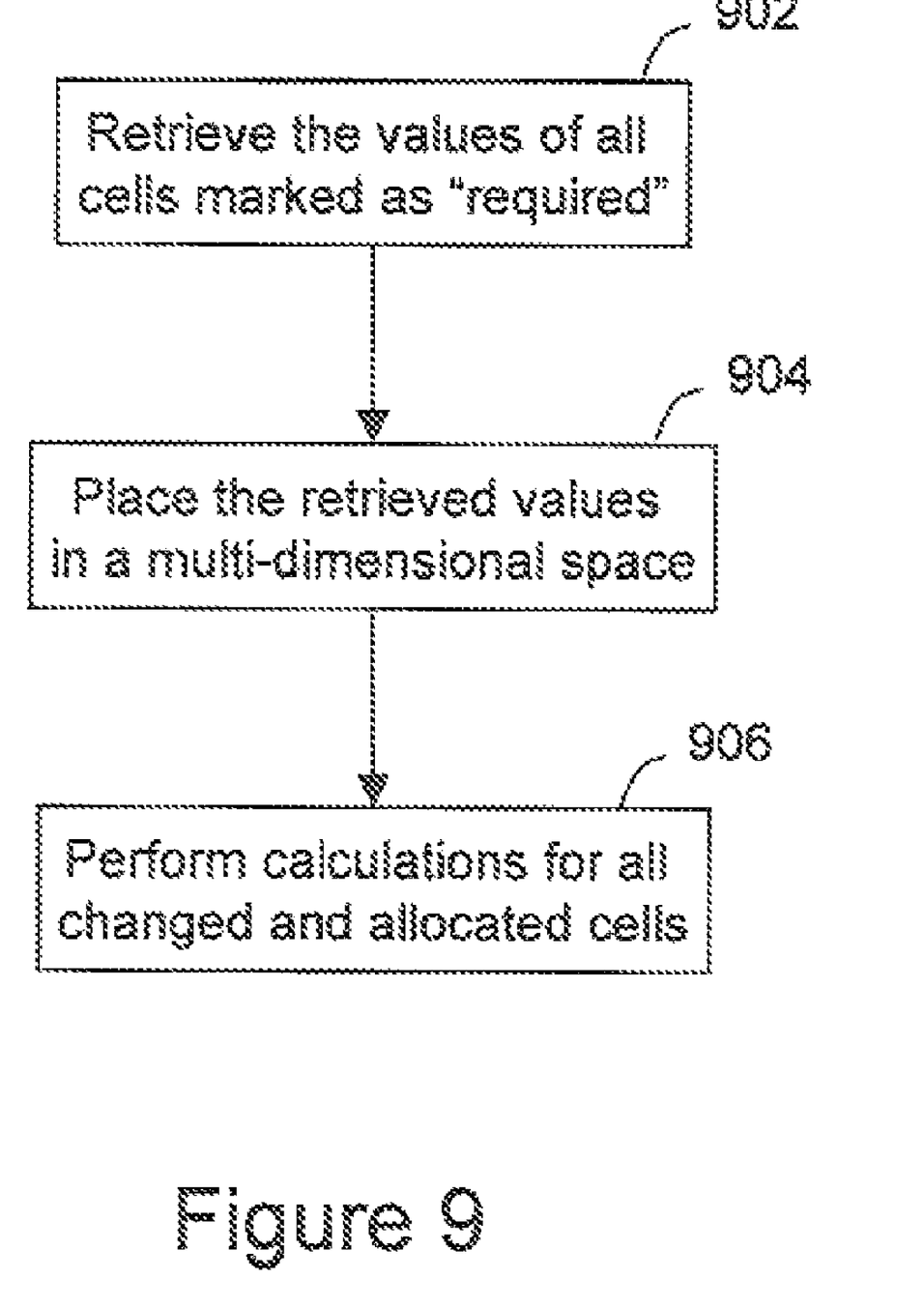
FIG. 9 shows exemplary steps of calculating for multidimensional databases.

Referring to FIG. 9, the list of "required" cells is used to retrieve the values for all cells marked "required" from the database 902 for performing calculations for all "changed" and "allocated" cells. Required values are then placed in the cells of the multidimensional space without triggering allocations, changes or additional requirements 904, and a new state is calculated 906. After the calculation only "changed" cells are written to the database. Hence, only "changed" or "allocated" cells are recalculated.

The values of cells are not required if they are to be recalculated. However the original values of such cells can be retrieved so that after recalculation, the original and modified values can be compared. If they are identical, it is not necessary to write the new values back to the database. The decision to retrieve the values to be recomputed is based on a cost-benefit estimate which depends on the relative cost of retrieving values from the database verses writing back to the database and an estimate of the probability that a calculation will change a value.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A calculation engine in a computer system with a processor for updating values in a multidimensional database, the calculation engine comprising:
    a downward propagator, executed by the processor, for determining a set of first component cells of a first cell, the set of first component cells affecting the first cell through a first set of formulas, wherein the calculation engine receives a value for updating the first cell in the multidimensional database and wherein the calculation engine marks the first cell as a changed cell;
    the downward propagator determining a set of subsequent component cells affecting the set of first component cells through a first set of subsequent formulas;
    the downward propagator marking the set of first component cells and the set of subsequent component cells as allocated cells;
    an upward propagator, when executed by the processor, for determining a set of first target cells, the set of first target cells being affected by the first cell, the set of first component cells, or the set of subsequent component cells through a second set of formulas;
    the upward propagator determining a set of subsequent target cells affected by the set of first target cells through a second set of subsequent formulas;
    the upward propagator marking the set of first target cells and the set of subsequent target cells as changed cells;
    a downward searcher, executed by the processor, for identifying a third set of formulas for the set of first component cells, the set of subsequent component cells, the set of first target cells, or the set of subsequent target cells;
    the downward searcher determining a set of unmarked component cells through the third set of formulas;
    the downward searcher marking the set of unmarked component cells as a required cells;
    the calculation engine performing calculations for the first cell, the set of first component cells, the set of subsequent component cells, the first target cells, and the set of subsequent target cells; and
    the calculation engine updating only cells marked as changed cells based on the calculations.

2. The calculation engine according to claim 1, further comprising:
    a module, executed by the processor, for retrieving values of the first cell, the set of first component cells, the set of subsequent component cells, the set of first target cells, and the set of subsequent target cells; and
    a multidimensional space for placing the retrieved values.

3. The calculation engine according to claim 2, further comprising:
    the calculation engine placing values of the marked cells in the multidimensional space without triggering allocations; and
    the calculation engine calculating a new state for the first cell, the set of first component cells, the set of subsequent component cells, the set of first target cells, and the set of subsequent target cells.

4. The calculation engine according to claim 1, further comprising:
    a value comparator, executed by the processor, comparing values of cells before and after recalculating the cells; and
    the calculation engine updating only those cells marked as changed cells that have a different value after recalculating the cells than before recalculation the cells.

5. The calculation engine according to claim 4, wherein the multidimensional database is not updated if, before and after recalculating the cells, the values of cells are identical.

6. The calculation engine according to claim 1, wherein the multidimensional database is remote from the calculation engine.

7. A method in a calculation engine of a computer system for updating values in a multidimensional database comprising the steps of:
    receiving, by the calculation engine, a value for updating a first cell in the multidimensional database;
    determining, by a downward propagator of the calculation engine, a set of first component cells of the first cell, the set of first component cells affecting the first cell through a first set of formulas;
    determining, by the downward propagator, a set of subsequent component cells affecting the set of first component cells through a first set of subsequent formulas;

marking, by the calculation engine, the first cell receiving the input as a changed cell;

marking, by the downward the set of first component cells and the set of subsequent cells as allocated cells;

determining, by the upward propagator of the calculation engine a set of first target cells, the set of first target cells being affected by the first cell, the set of first component cells, or the set of subsequent component cells through a second set of formulas;

determining, by the upward propagator, a set of subsequent target cells affected by the set of first target cells through a second set of subsequent formulas;

marking, by the upward propagator, the set of first target cells and the set of subsequent target cells as changed cells;

identifying, by a downward searcher of the calculation engine, a third set of formulas for the set of first component cells, the set of subsequent component cells, the set of first target cells, or the set of subsequent target cells;

determining, by the downward searcher, a set of unmarked component cells through the third set of formulas;

marking, by the downward searcher, the set of unmarked component cells as a required cells;

performing, by the calculation engine, calculations for the first cell, the set of first component cells, the set of subsequent component cells, the first target cells, and the set of subsequent target cells; and updating, by the calculation engine, only cells marked as changed cells based on the calculations.

8. The method according to claim 7, further comprising:
retrieving, by the calculation engine, values of the first cell, the set of first component cells, the set of subsequent component cells, the set of first target cells, and the set of subsequent target cells; and defining, by the calculation engine, a multidimensional space for placing the retrieved values.

9. The method according to claim 8, further comprising:
placing, by the calculation engine, values of the marked cells in the multidimensional space without triggering allocations; and calculating, by the calculation engine, a new state for the first cell, the set of first component cells, the set of subsequent component cells, the set of first target cells, and the set of subsequent target cells.

10. The method according to claim 7, further comprising:
comparing, by the calculation engine, values of cells marked as changed cells before and after recalculating the cells; and updating, by the calculation engine, only those cells in the multidimensional database marked as changed cells that have a different value after recalculating the cells than before recalculation the cells.

11. The method according to claim 10, wherein the multidimensional database is not updated if, before and after recalculating the cells, the values of cells are identical.

12. A computer program product comprising a computer readable storage medium readable having a computer readable program for execution by the computer to carry out a method for updating values in a multidimensional database recorded thereon, wherein the computer readable program, when executed on a computing device, causes the computing device to:

receive a value for updating a first cell in the multidimensional database;

determine a set of first component cells of the first cell, the set of first component cells affecting the first cell through a first set of formulas;

determine a set of subsequent component cells affecting the set of first component cells through a first set of subsequent formulas;

mark the first cell receiving the input as a changed cell;

mark the set of first component cells and the set of subsequent component cells as allocated cells;

determine a set of first target cells, the set of first target cells being affected by the first cell, the set of first component cells, or the set of subsequent component cells through a second set of formulas;

determining a set of subsequent target cells affected by the set of first target cells through a second set of subsequent formulas;

mark the set of first target cells and the set of subsequent target cells as changed cells;

identify a third set of formulas for the set of first component cells, the set of subsequent component cells, the set of first target cells, or the set of subsequent target cells;

determine a set of unmarked component cells through the third set of formulas;

mark the set of unmarked component cells as a required cells;

perform calculations for the first cell, the set of first component cells, the set of subsequent component cells, the first target cells, and the set of subsequent target cells; and update only cells marked as changed cells based on the calculations.

13. The computer program product according to claim 12, wherein the computer readable program further causes the computing device:

retrieve values of the first cell, the set of first component cells, the set of subsequent component cells, the set of first target cells, and the set of subsequent target cells; and place the retrieved values in a multidimensional space.

14. The computer program product according to claim 13, wherein the computer readable program further causes the computing device:

place values of the marked cells in the multidimensional space without triggering allocations; and calculating, by the calculation engine, a new state for the first cell, the set of first component cells, the set of subsequent component cells, the set of first target cells, and the set of subsequent target cells.

15. The computer program product according to claim 12, wherein the first cell is affected by a plurality of component cells and wherein the computer readable program further causes the computing device:

compare values of cells before and after recalculating the cells; and update only those cells in the multidimensional database marked as changed cells that have a different value after recalculating the cells than before recalculation the cells.

16. The computer program product according to claim 15 wherein the multidimensional database is not updated if, before and after recalculating the cells, the values of cells are identical.

* * * * *